US007953375B2

(12) United States Patent
Huang et al.

(10) Patent No.: US 7,953,375 B2
(45) Date of Patent: May 31, 2011

(54) COMMUNICATION MODULE WITH DUAL SYSTEMS AND METHOD FOR DEFINING OPERATING MODE THEREOF

(75) Inventors: Chung-Er Huang, Taipei (TW); Sheng-Wen Chen, Taipei (TW)

(73) Assignee: Azurewave Technologies, Inc., Taipei (TW)

( * ) Notice: Subject to any disclaimer, the term of this patent is extended or adjusted under 35 U.S.C. 154(b) by 617 days.

(21) Appl. No.: 12/149,411

(22) Filed: May 1, 2008

(65) Prior Publication Data

US 2009/0275296 A1 Nov. 5, 2009

(51) Int. Cl.
*H04B 1/44* (2006.01)

(52) U.S. Cl. ............................................ 455/78; 455/82

(58) Field of Classification Search .................... 455/73, 455/78, 80, 82, 83, 84, 550.1, 552.1, 553.1, 455/91, 121, 129; 333/101, 103, 104
See application file for complete search history.

(56) References Cited

U.S. PATENT DOCUMENTS

2005/0085260 A1* 4/2005 Ella et al. .................. 455/552.1
2007/0141997 A1* 6/2007 Wulff et al. ..................... 455/78
2011/0021135 A1* 1/2011 Broski et al. .................. 455/78

* cited by examiner

*Primary Examiner* — Thanh C Le
(74) *Attorney, Agent, or Firm* — Rosenberg, Klein & Lee

(57) ABSTRACT

A communication module with dual systems for processing a first RF signal and a second RF signal that belong to different communication systems is provided. The communication module includes a first connection port and a signal distribution circuit. The first connection port is coupled to an external circuit, and the signal distribution circuit is coupled to the first connection port and between a first system path and a second system path inside the communication module. Regardless whether the external circuit is composed by an dual-band antenna or two uni-band antenna, the signal distribution circuit controls the first RF signal transmitting along the path between the first connection port and the first system path and controls the second RF signal transmitting along the path between the path between the first connection port and the second system path.

20 Claims, 6 Drawing Sheets

COMMUNICATION MODULE WITH DUAL SYSTEMS AND METHOD FOR DEFINING OPERATING MODE THEREOF

BACKGROUND OF THE INVENTION

1. Field of the Invention

The present invention relates to a communication module and particularly to a communication module with dual systems and a method for defining its operating mode.

2. Description of Related Art

Along with the wireless communication technology gradually developing, the application of a wireless networks has gone beyond computer platforms and extends into mobile phones, digital still cameras (DSC), digital video players, game devices, and other electronic consumer products. At the present time, electronic products provided with wireless communication function are increasingly required in the consumer market.

The wireless communication function in a device is generally supported by three major function blocks which includes Radio Frequency (RF) for receiving and transmitting a signal, Intermediate Frequency (IF) for secondary frequency modulation and frequency conversion, and a baseband for processing and storing data. At the present stage, there are two technologies of System on Chip (SoC) and System in Package (SiP) that may be used to integrate the complicated wireless signal processing mechanism into a single component; thus, the power consumption and area occupied by a PCB may be reduced and device design may be simplified, which is of assistance to the shortening of development schedule for a back-end product. The technology of SoC must be confronted with a great number of issues on Silicon IP, design, verification, packaging, and testing in a manufacturing process, while the technology of SiP on the other hand is flexible in terms of manufacturing process for a communication module and easier to accommodate customization requirements.

Communication module is being developed towards a target of multifunctional integration, with the aim of having a plurality of communication systems in a single module. For example, a dual system provided with wireless local area network (WLAN) function and wireless personal area network (WPAN) function, such as Bluetooth, may support the connection between information devices and that between a device and Internet.

Regarding the device design, a single dual-band antenna or two uni-band antennae may be used for a dual wireless communication function to receive and transmit two types of wireless signals. The signal transmission paths in the two application modes are different, so different circuits must be used for matching. Thus, at present, dual-system communication module is frequently provided for a module product having different internal circuits to match with the antenna mode used by a client. In addition to the front-end antenna operation mode, the transmission interface type and oscillation pulse frequency of the module are also based on customer requirements. Thus, a manufacturer must establish module products with various specifications to meet the customer design.

A diverse communication module is a burden for the manufacturer in the aspects of manufacturing and marketing controls; whereas for a back-end industry, a single module is given for only a fixed design mode, which is limited in flexibility. In consideration of the mentioned-above limitations of prior art, the inventor brings up the present invention to improve the current technical limitations.

Consequently, because of the technical limitations described above, the applicant strives via experience and research to develop the present invention, which can effectively improve the limitations described above.

SUMMARY OF THE INVENTION

Thus, the present invention provides a communication module with dual systems and method for defining operating mode thereof, in which an internal signal distribution circuit is used to match with an external circuit to form a dual-band antenna circuit or a uni-band antenna circuit, both of which may control a RF signal being transmitted along a predetermined path, and since the identical communication module may be applied in different operation modes, which results in the lowering of the burden with the manufacturing control and increasing the flexibility of application design.

The present invention discloses: a communication module with dual systems is compliantly coupled to an external circuit to process a first RF signal and a second RF signal, in which the external circuit is a dual-band antenna circuit or a uni-band antenna circuit. The communication module with dual systems comprises a first connection port and a signal distribution circuit. The first connection port is coupled to the external circuit to transmit the first RF signal and the second RF signal. The signal distribution circuit is coupled to the first connection port and between a first system path and a second system path inside the communication module. Regardless whether the external circuit is composed by the dual-band antenna or the uni-band antenna, the signal distribution circuit controls the first RF signal transmitting along the path between the first connection port and the first system path, and controls the second RF signal transmitting along the path between the first connection port and the second system path.

The present invention further discloses: a wireless device that is provided with the communication module with dual systems, and the external circuit. The wireless device comprises a dual-band antenna or two uni-band antennae that are coupled to the communication module with dual systems to receive and transmit the first RF signal and the second RF signal.

The present invention also discloses: a method of defining operating mode that is applicable for defining the operating mode of the communication module with dual systems. The method for defining operating mode comprises steps of providing the communication module with dual systems and then forming the external circuit coupled to the first connection port into the dual-band antenna circuit or the uni-band antenna circuit so as to determine the operating mode of the communication module with dual systems.

In order to further elaborate the technical means and effects adopted for the object of the present invention, refer to the detailed description according to the present invention accompanied with drawings; it is believed that the object, features, and points of the present invention will be apparent from the description; however, the accompanied drawings are provided for reference and illustration only and not limited to the present invention.

BRIEF DESCRIPTION OF THE DRAWINGS

FIGS. 1 through 3 are schematic views illustrating the appearance of a packaged communication system with dual systems in an embodiment of the present invention, in which FIG. 1 is a front view, FIG. 2 is a side view, and FIG. 3 is a top view of a layout of pins;

DETAILED DESCRIPTION OF THE PREFERRED EMBODIMENTS

Now, the present invention will be described more specifically with reference to the following embodiments. It is to be noted that the following descriptions of preferred embodiments of the present invention are presented herein for purpose of illustration and description only; it is not intended to be exhaustive or to be limited to the precise form disclosed.

Figure 1:
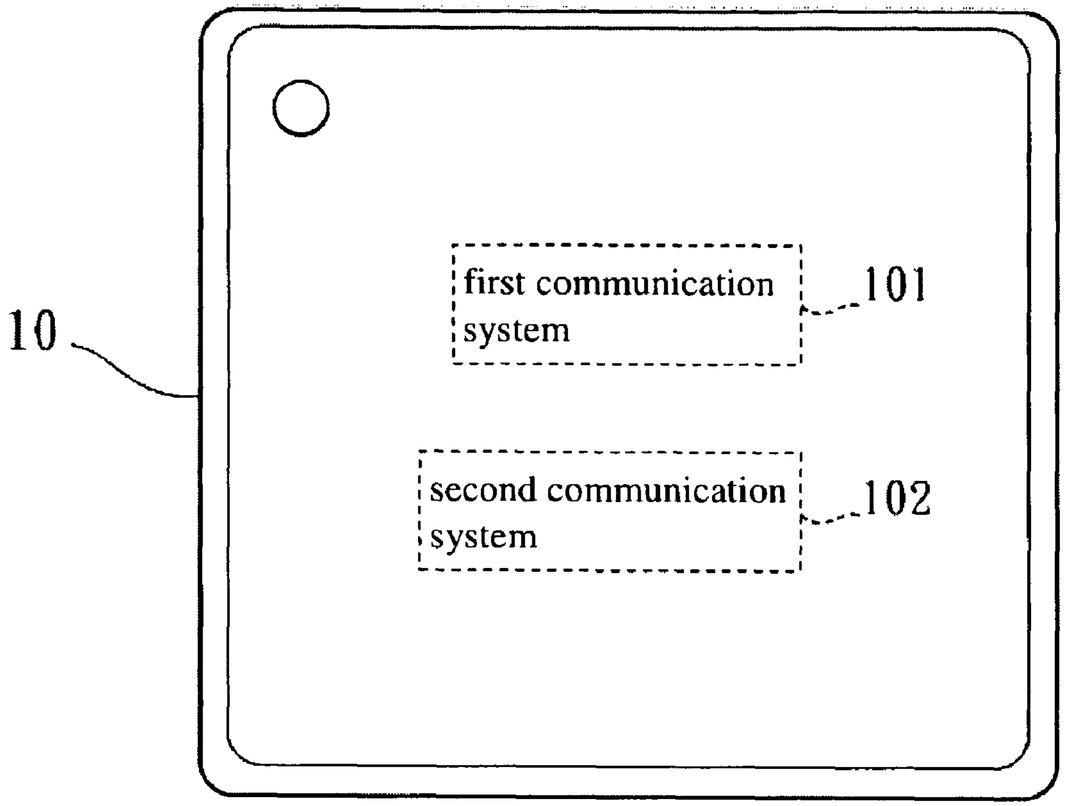
Figure 2:
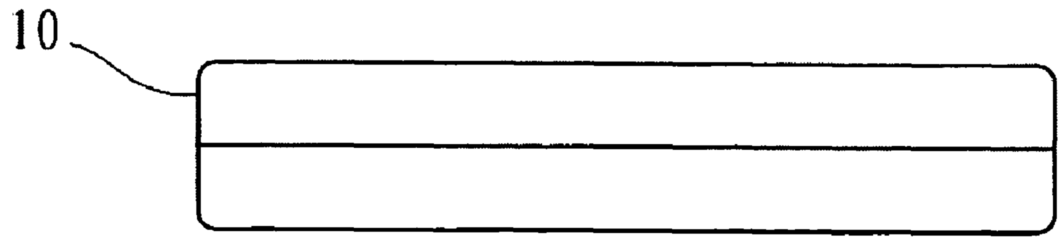
Figure 3:
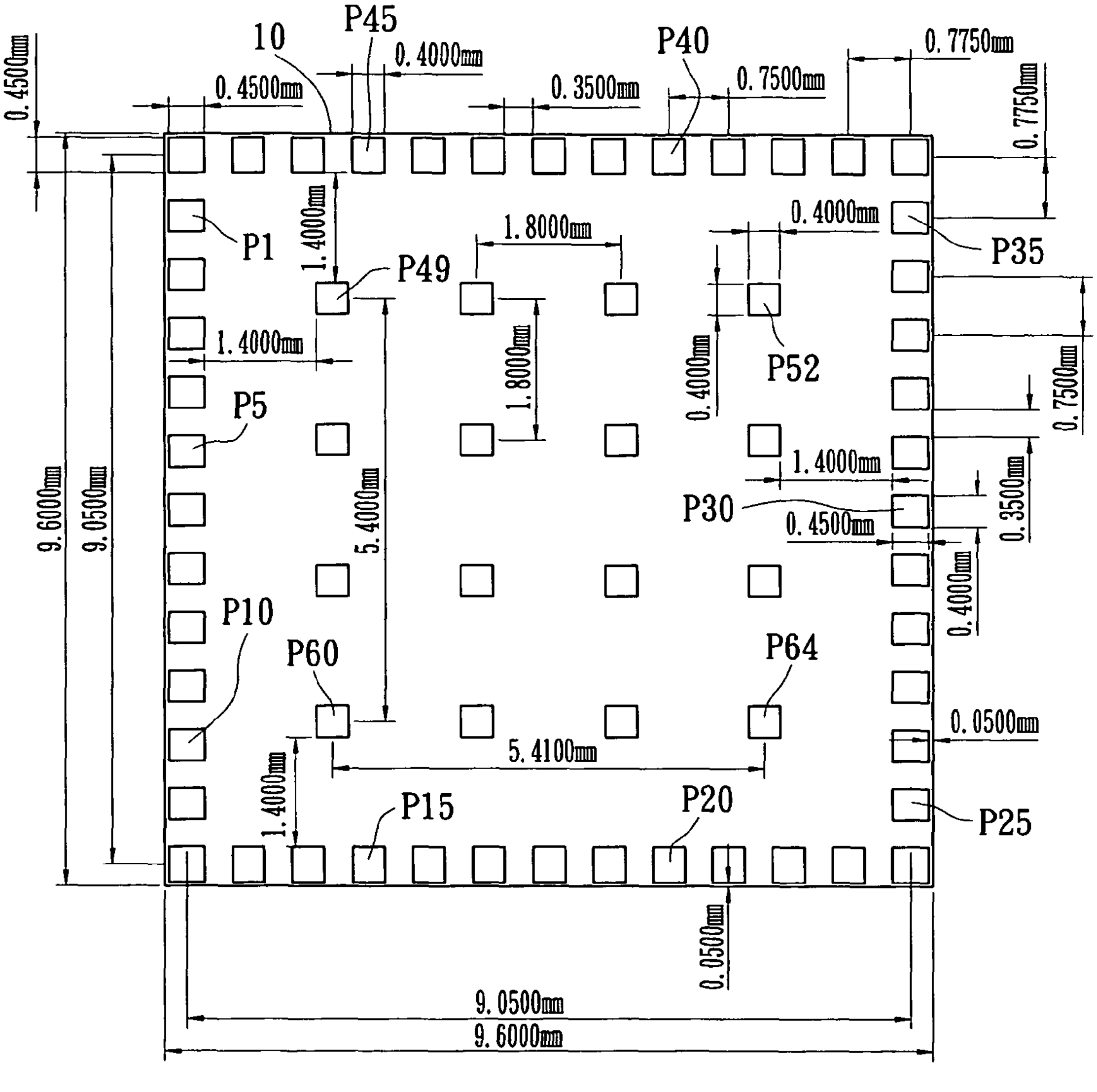

Refer to FIGS. 1 through 3 illustrating the appearance of a packaged communication system with dual systems in an embodiment of the present invention, in which FIG. 1 is a front view, FIG. 2 is a side view, and FIG. 3 is a top view of a layout of pins.

The communication module with dual systems 10 is provided in a wireless device to support wireless communication function of the device. Through electronic components and circuit such as a RF chip, a baseband chip, a digital signal processor (DSP), an oscillatory circuit, and a filter integrated inside, the frequency synthesis, data conversion, noise filtering, encoding and decoding, frequency hopping, and packet processing of the RF signal are achieved to process the wireless signal. As shown in FIGS. 1 through 3, the communication module with dual systems 10 my be packaged into a single component of a specified specification by manner of molding or metallic shield. In the figures, the communication module with dual systems 10 is packaged with 64 pins and, when being practically applied, is mounted onto a Printed Circuit Board (PCB) via a Surface Mount Technology (SMT) process to work with the antenna, peripheral interface circuits, and a back-end application module in order to achieve the functionality of device.

In FIG. 3 as a top view of a layout of pins, the length and width marked for the size, and pin numbers are shown as description for a possible condition of embodiment implementation. In FIG. 3, a value is marked for a size in a unit of millimeter (mm), but what is drawn in FIG. 3 is given as description of the present invention only and not used to limit the present invention.

As shown in FIG. 1, the communication module with dual systems 10 is provided with a first communication system 101 and a second communication system 102 operation functions in order to support two different wireless communication systems for signal processing. In an embodiment, the first communication system 101 and the second communication system 102 are respectively a Wireless Local Area Network (WLAN) system and a Wireless Personal Area Network (WPAN) system, such as Bluetooth, being used to support the connection between devices and that between a device and a network.

In comparison of the module product according to the present invention against a conventional module product, the communication module with dual systems 10 according to the present invention may be in a same internal circuit structure and be flexibly coupled to a dual-band antenna circuit or a uni-band antenna circuit to receive and transmit the wireless signal through a single dual-band antenna or two uni-band antenna, while the conventional module product must match with two antenna circuits in different internal circuit structures.

Figure 4:
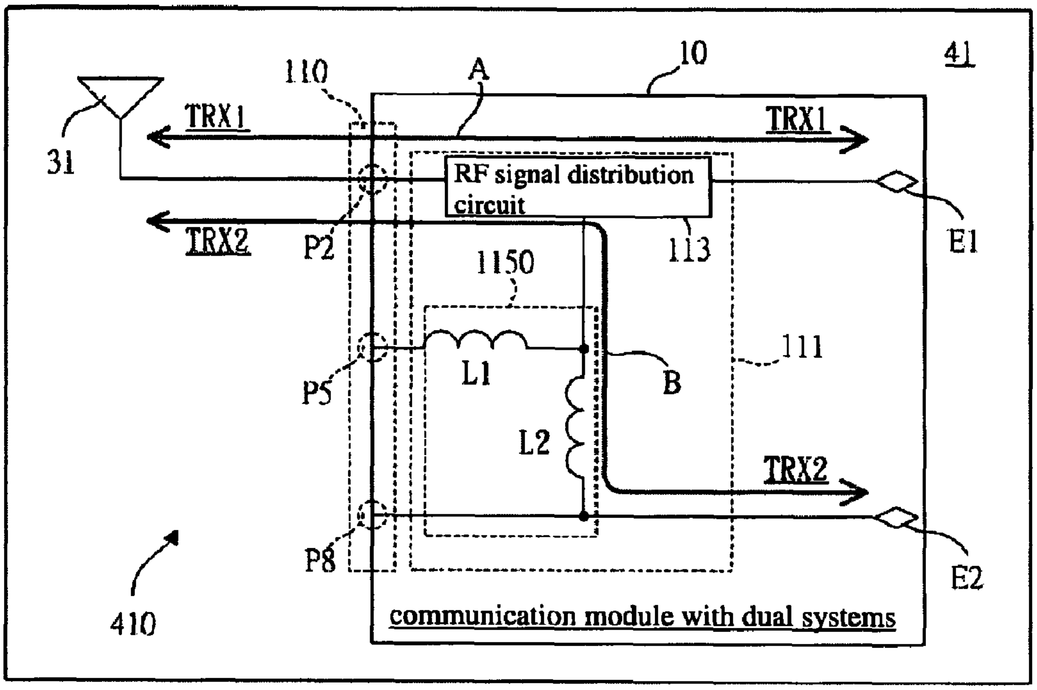
FIGS. 4 and 5 are schematic views illustrating the structure of communication module with dual systems in an embodiment of the present invention, these 2 figures shows the communication module with dual systems that operates in different antenna modes.
Figure 5:
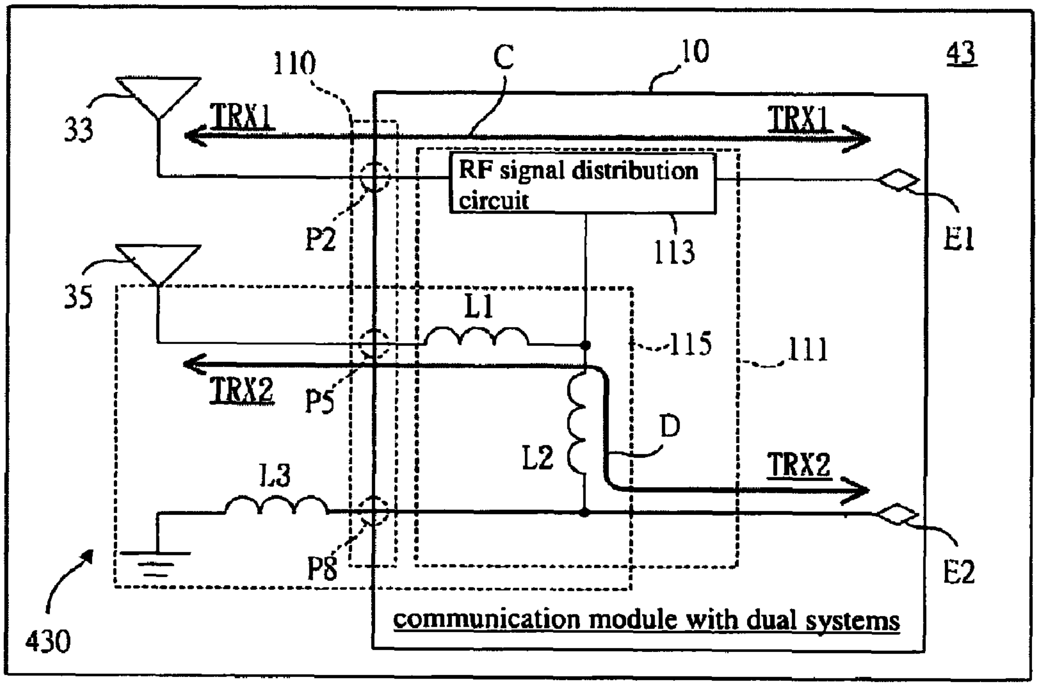

Refer to FIGS. 4 and 5; these 2 figures shows a schematic view illustrating the structure of communication module with dual systems in an embodiment of the present invention; FIGS. 4 and 5 illustrates the communication module with dual systems 10 that are separately provided in wireless devices 41 and 43 and operate in the dual-band antenna mode and the uni-band antenna mode. the communication module with dual systems 10 is provided with a first connection port 110 to transmit a first RF signal TRX1 and a second RF signal TRX2, and through external circuits 410 and 430 coupled to the first connection port 110, the communication module with dual systems 10 may be set for operation in the dual-band antenna mode or the uni-band antenna mode.

The signal of two different specifications must be processed respectively through the systems. As shown in the figure, the first RF signal TRXI fed into the communication module with dual modules 10 is transmitted to the first communication system 101 (as shown in FIG. 1) along a first system path E1, while the second RF signal TRX2 is transmitted to the second communication system 102 (as shown in FIG. 1) along a second system path E2. In the dual-band antenna mode and the uni-band antenna mode, the first RF signal TRX1 and the second RF signal TRX2 must be respectively transmitted along the path to the first communication system 101 and the second communication system 102. The communication module with dual systems 10 is provided with a signal distribution circuit 111 coupled to the first connection port 110 and between the first system path E1 and the second system path E2 to control the RF signals TRX1 and TRX2 being transmitted along the path.

In the embodiment, the first connection port 110 comprises three pins, respectively P2, P5, and P8. The signal distribution circuit 111 comprises a RF signal distribution circuit 113 and a coupled circuit component 1150. The RF signal distribution circuit 113 is coupled to P2 of the first connection port 110 and between the first system path E1 and the second system path E2. The coupled circuit component 1150 is coupled to P5 and P8 of the first connection port 110, the RF signal distribution circuit 113, and the second system path E2. The RF signal distribution circuit 113 may shunt and couple the first RF signal TRX1 and the second RF signal TRX2. The coupled circuit component 1150 and the external circuit 430 may be combined into a complete coupled circuit 115, as shown in FIG. 5. In the figure, the coupled circuit component 1150 comprises two inductors L1 and L2, in which one terminal of the inductor L2 is coupled to the RF signal distribution circuit 113 and the other terminal is coupled to a path between P8 and the second system path E2; one terminal of the inductor L1 is coupled to P5 and the other terminal is coupled to a transmission path between the inductor L2 and the RF signal distribution circuit 113. Operation mechanisms in two modes in the figure are described in detail below.

When the communication module with dual systems 10 is applied in the dual-band antenna mode in FIG. 4, the external circuit 410 coupled to the first connection port 110 must be formed into a dual-band antenna circuit, including a dual-band antenna 31 coupled to P2, in which P5 and P8 are floating.

The first RF signal TRXI and the second RF signal TRX2 that are fed through the dual-band antenna 31 are shunt by the RF signal distribution circuit 113, so the first RF signal TRX1 is transmitted to the first system path E1 and the second RF signal TRX2 is transmitted to the second system path E2; contrarily, the first RF signal TRX1 transmitted from the first system path E1 and the second RF signal TRX2 transmitted from the second system path E2 are coupled by the RF signal distribution circuit 113 and thus the two types of signals are transmitted to the dual-band antenna 31 along the same path. As shown in the figure, the first RF signal TRX1 is transmitted along path A, while the second RF signal TRX2 is transmitted along path B.

The RF signal distribution circuit 113 may couple high frequency signals of the two communication systems, and because the related circuit structure is formed in a conventional technology and because circuit structure can be implemented in many ways, thereby it is unnecessary to go into further details regarding the RF signal distribution circuit.

When the communication module with dual systems 10 is applied in the uni-band antenna mode in FIG. 5, the external circuit 430 coupled to the first connection port 110 must be formed into a uni-band antenna circuit, comprising the first antenna 33 coupled to P2, the second antenna 35 coupled to P5, and a ground inductor L3 coupled to P8. Here, The first antenna 33 receives and transmits the first RF signal TRX1, the second antenna 35 receives and transmits the second RF signal TRX2, the ground inductor L3 and the coupled circuit component 1150 are combined into a complete coupled circuit 115 being coupled between the second antenna 35 and the second system path E2.

The first RF signal TRX1 passes through the RF signal distribution circuit 113 and is transmitted between the first antenna 33 and the first system path E1 along path C. The coupled circuit 115 coupled to the second antenna 35 may isolate the second RF signal TRX2 from the first RF signal TRX1, so the second signal TRX2 is transmitted between the second antenna 35 and the second system path E2 along path D and thus not transmitted towards the RF signal distribution circuit 113.

To sum up, devices 41 and 43 use different external circuits 410 and 430 coupled to the first connection port 110 to control the communicating module 10 with dual systems operating in the dual-band antenna mode and the uni-band antenna mode. The coupled circuit component 1150 is used and formed into the complete coupled circuit 115 to control the second RF signal TRX2 being transmitted in a direction.

By the way, a transmission cable external to P2, P5, and P8, and the dual-band antenna 31, the first antenna 33, the second antenna 35, and the ground inductor L3 transmits high frequency signal and thus must be designed for impedance matching, and the impedance of wireless communication system is 50 ohm. Further, the inductance of ground inductor L3 may be adjusted according to the actual hardware specification for optimum signal characteristic and minimum signal loss.

Figure 6:
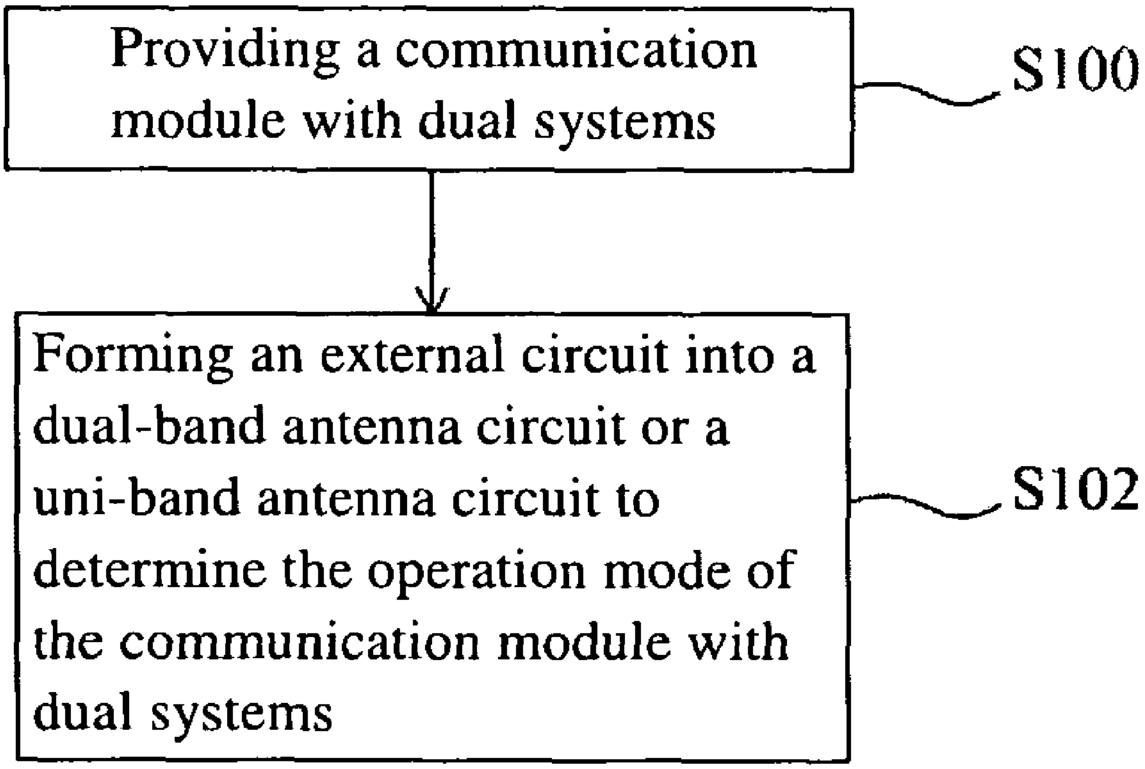
FIG. 6 is a step flow chart of a method for defining operating mode of the communication module with dual systems according to the present invention.

Next, refer to FIG. 6 showing a step flow chart of a method for defining operating mode of the communication module with dual systems according to the present invention. Refer to FIGS. 4 and 5 for the related system structure. As shown in FIG. 6, the method of defining operating mode comprises the following steps.

First, the communication module 10 with dual systems is provided (step S100).

Second, the external circuits 410 and 430 coupled to the first connection port 110 are combined into the dual-band antenna circuit (as shown in FIG. 4 for the external circuit 410) or the uni-band antenna circuit (as shown in FIG. 5 for the external circuit 430) to determine whether the communication module with dual systems 10 in the operation mode receives and transmits the wireless signal through the dual-band antenna 31 or through the uni-band first antenna 33 and second antenna 35 (step S102).

For the design of a back-end application device that is much more flexible, the communication module with dual systems 10 according to the present invention is provided with a plurality of clock pulse sources and transmission interfaces, wherein which clock pulse sources and interfaces are to be used is decided through the setting of external circuit.

Figure 7:
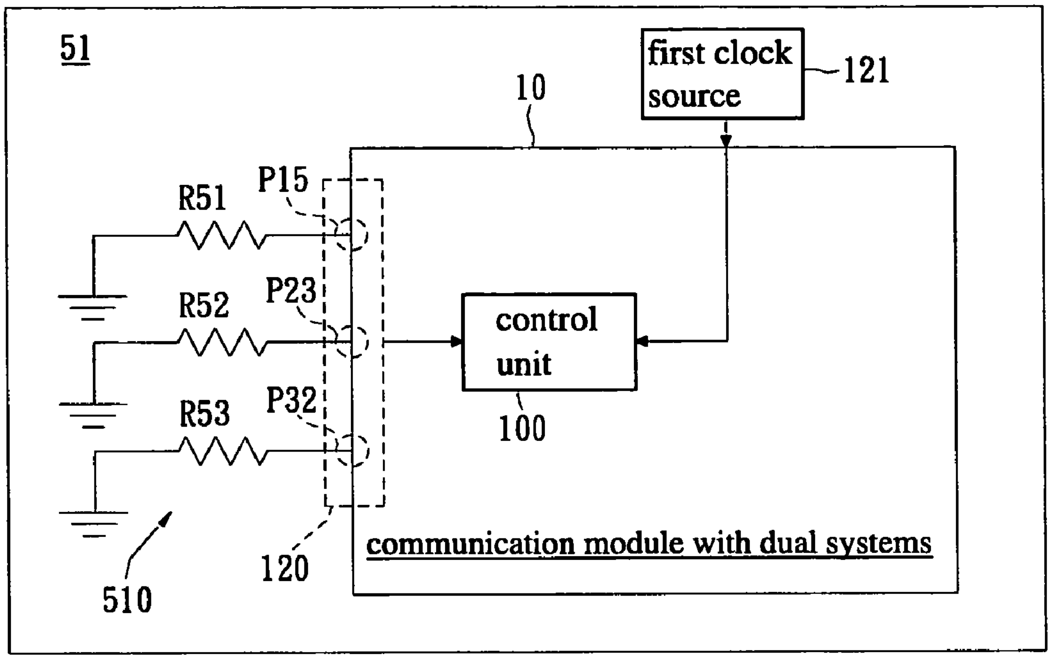
FIGS. 7 and 8 are schematic views illustrating the structure of communication module with dual systems in another embodiment of the present invention, these 2 figures shows the communication module with dual systems that may operate in different pulse frequency modes.
Figure 8:
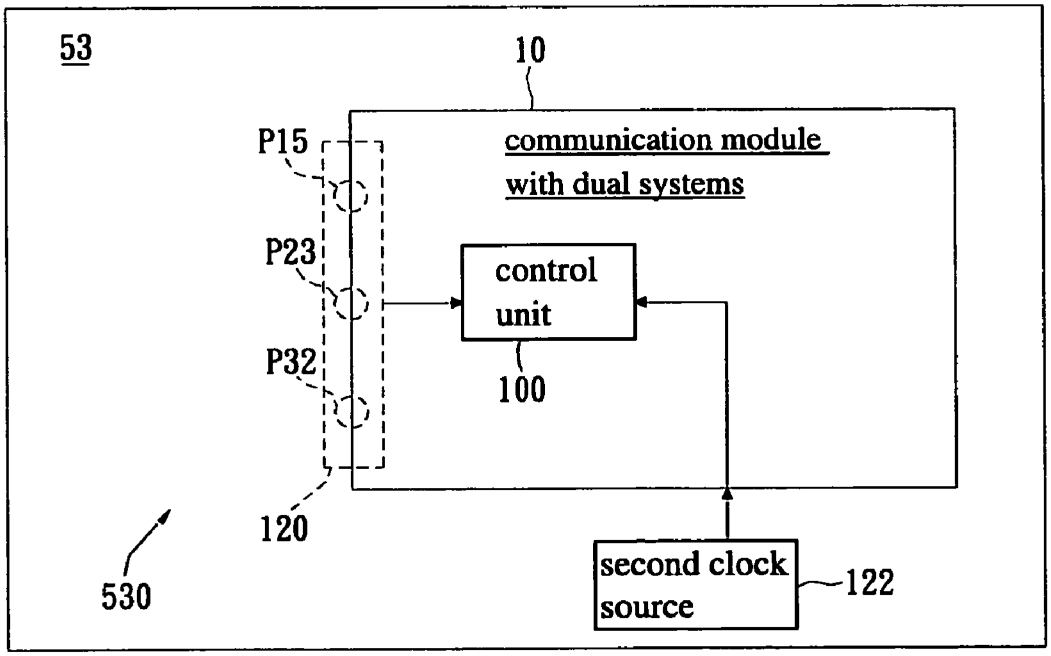

Refer to FIGS. 7 and 8 illustrating the structure of communication module with dual systems in another embodiment of the present invention, these two figures showing the communication module with dual systems that operates in different pulse frequency modes. As shown in FIGS. 7 and 8, the communication module with dual systems 10 is provided with a control unit 100 and a second connection port 120. The control unit 100 is a logic control kernel in the communication module with dual systems 10 and is activated by the external circuits 510 and 530 coupled to the second connection port 120 to receive different reference clocks CLK.

In the embodiment, the second connection port 120 comprises P15, P23, and P32. In FIG. 7, P15, P23, and P32 are respectively coupled to ground resistors R51, R52, and R53, and the voltage of pins is pulled low so that the control unit 100 is made to receive a first clock (CLK) 121. In FIG. 8, P15, P23, and P32 are floating, of which the voltage is kept at a level of floating state so that the control unit 100 is made to receive a second clock (CLK) 122.

The amount of internal clocks, the number of pins of the second connection port 120, and the configuration of external circuits are illustrations only for clarifying the idea of technology and is not meant to limit the present invention.

Figure 9:
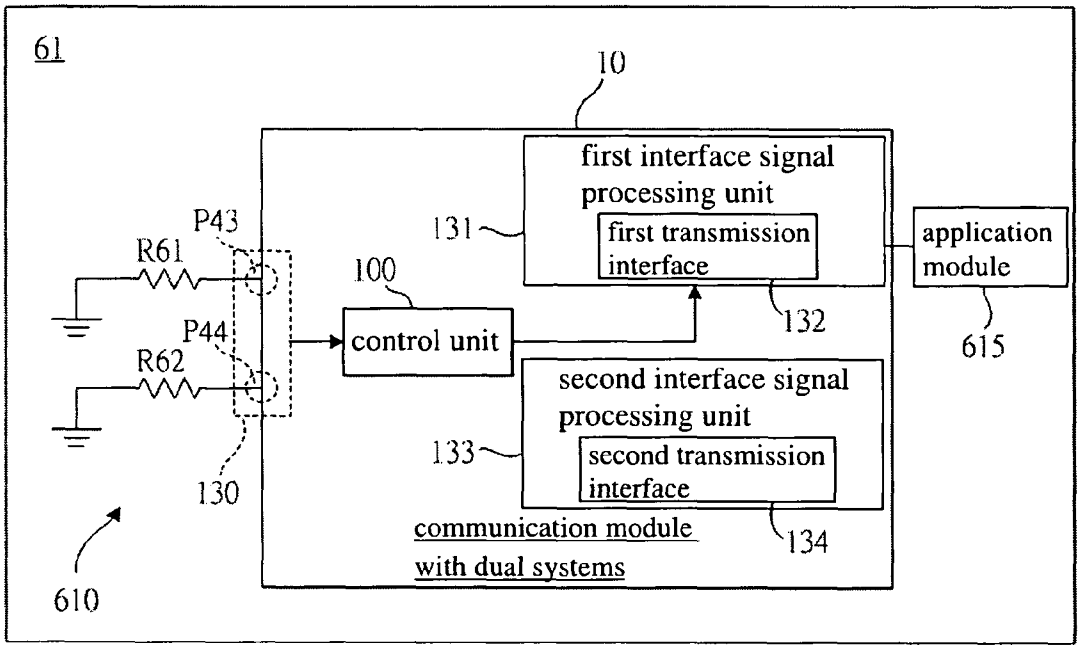
FIGS. 9 and 10 are schematic views illustrating the structure of communication module with dual systems in a still further embodiment of the present invention, these 2 figures shows the communication module with dual systems that may operate in different interface modes.
Figure 10:
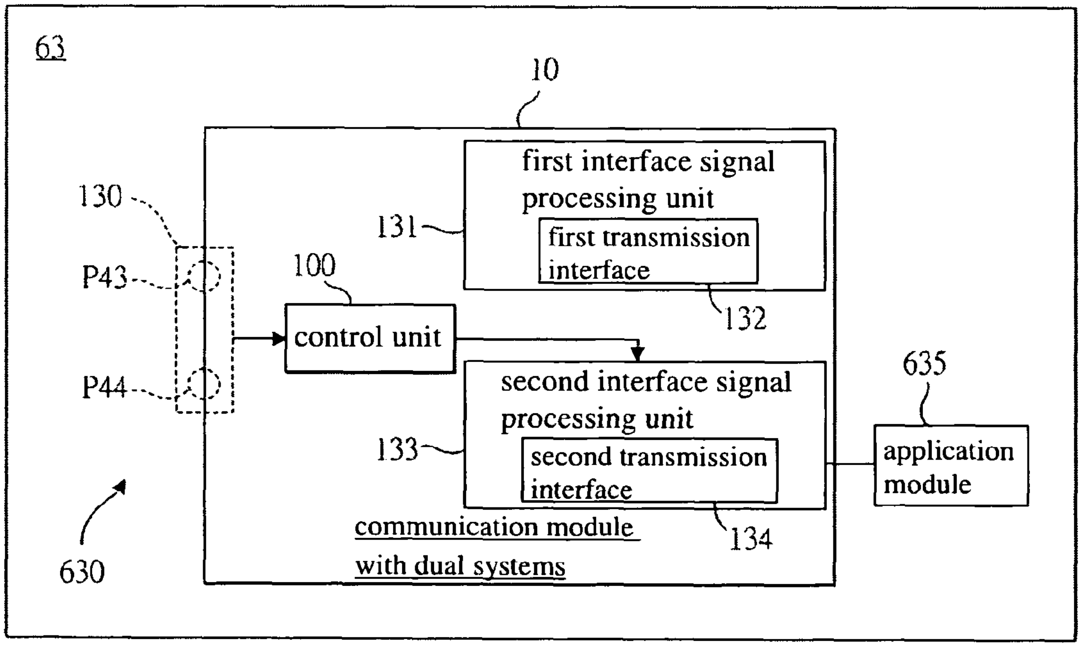

Next, refer to FIGS. 9 and 10 illustrating the structure of communication module with dual systems in an embodiment of the present invention, these two figures showing the communication module with dual systems that operates in different interface modes. As shown in FIGS. 9 and 10, the communication module with dual systems 10 is provided with a first interface signal processing unit 131, a second interface signal processing unit 133, a control unit 100, and a third connection port 130. The first interface signal processing unit 131 and the second interface signal processing unit 133 may convert the signals into interface signals of different specifications and transmit them through a first transmission interface 132 and a second transmission interface 134, respectively. The control unit 100 is the logic control kernel in the communication module with dual systems 10, and the first interface signal processing unit 131 and the second interface signal processing unit 133 are activated by the external circuits 610 and 630 coupled to the third connection port 130.

In the embodiment, application modules 615 and 635 in the wireless devices 61 and 63 respectively use the first transmission interface 132 and the second transmission interface 134 to transmit the signal to and receive the signal from the communication module with dual systems 10. The third connection port 130 comprises P43 and P44. In FIG. 9, P43 and P44 are respectively coupled to ground resistors R61 and R62, and the voltage of the pins is pulled low so that the control unit 100 drives the first interface signal processing unit 131 to convert the interface signal. In FIG. 10, P43 and P44 are floating, of which the voltage is kept at the level of floating state so that the control unit 100 activates the second interface signal processing unit 133 to convert the interface signal.

The first transmission interface 132 and the second transmission interface 134 may be in one of the specifications of SDIO, G-SPI, and UART. The amount of interface signal processing units, the number of pins of the third connection port 130, and the configuration of external circuits are illustrations only for clarifying the idea of technology and is not meant to limit the present invention.

From the description of embodiment above, it is apparent that the communication module with dual systems according to the present invention uses the configuration of external circuits coupled to the specified connection port to define the types of antenna modes, clocks, and transmission interfaces. The module is simplified for effective cost reduction request on manufacturing control's side and for satisfying customers' side with various application modes. Thus, it is seen that the invention is beneficial both to production-end and back-end product business runner and aids the competition ability of products, and the wireless communication product is thereby bettered.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A communication module with dual systems is compliantly coupled to an external circuit to process a first RF signal and a second RF signal, in which the external circuit is a dual-band antenna circuit or a uni-band antenna circuit, comprising:

a first connection port coupled to the external circuit to transmit the first RF signal and the second RF signal; and a signal distribution circuit coupled to the first connection port and between a first system path and a second system path inside the communication module with dual systems, the signal distribution circuit controlling the first RF signal transmitted along the path between the first connection port and the first system path and controlling the second RF signal transmitted along the path between the first connection port and the second system path, regardless whether the external circuit is composed by a dual-band antenna or a uni-band antenna.

2. The communication module with dual systems according to claim 1, wherein the first connection port comprises a first pin, a second pin, and a third pin that are coupled to the external circuit;

the first pin being coupled to a dual-band antenna to transmit the first RF signal and the second RF signal and both pin 2 and pin 3 being floating when the external circuit is the dual-band antenna circuit;

the first pin being coupled to a first antenna to transmit the first RF signal, the second pin being coupled to a second antenna to transmit the second RF signal, and the third pin being coupled to a ground passive element when the external circuit is the uni-band antenna circuit.

3. The communication module with dual systems according to claim 2, wherein the first pin, the second pin, and the third pin of the first connection port correspond to P2, P5, and P8.

4. The communication module with dual systems according to claim 2, wherein the signal distribution circuit comprises:

an RF signal distribution circuit coupled to the first pin, the first system path, and the second system path; and a coupled circuit component coupled to the second pin, the third pin, the RF signal distribution circuit, and the second system path;

the RF signal distribution circuit distributing the first RF signal and the second RF signal inputted from the first pin to the first system path and the second system path respectively, and the first RF signal inputted from the first system path and the second RF signal inputted from the second system path are coupled to the first pin, when the external circuit is the dual-band antenna circuit;

the ground passive element and the coupled circuit component being combined into a complete coupled circuit that is coupled to the second pin, the RF signal distribution circuit, and the second system path so that the first RF signal is transmitted along a path between the first antenna and the first system and the second RF signal is transmitted along a path between the second antenna and the second system, when the external circuit is the uni-band antenna circuit.

5. The communication module with dual systems according to claim 4, wherein the coupled circuit component comprises a first inductor and a second inductor, in which two terminals of the first inductor are separately coupled to the second pin, the second system path and the RF signal distribution circuit and then coupled to one terminal of the second inductor, and the other terminal of the second inductor is coupled between the second system path and the transmission path of the third pin.

6. The communication module with dual systems according to claim 5, wherein the ground passive element is a ground inductor and the first RF signal and the second RF signal respectively belong to a WLAN and WPAN.

7. The communication module with dual systems according to claim 1, further comprising:

a second connection port coupled to another external circuit;

a plurality of clock sources; and a control unit coupled between the second connection port and the clock sources to start to receive reference clocks depending on a state of the external circuit coupled to the second connection port.

8. The communication module with dual systems according to claim 7, wherein the second connection port comprises three pins, respectively P15, P23, and P32, and the control unit selects the activated clock sources depending on voltage levels of the pins of the second connection port.

9. The communication module with dual systems according to claim 8, wherein the voltage levels of the pins of the second connection port are set depending on the pins that are coupled to a ground resistor.

10. The communication module with dual systems according to claim 1, further comprising:

a second connection port coupled to another external circuit;

a plurality of interface signal processing unit; and a control unit coupled between the third connection port and the interface signal processing units to decide to activate one of the interface signal processing units depending a state of the external circuit coupled to the third connection port.

11. The communication module with dual systems according to claim 10, wherein the third connection port comprises two pins, respectively P43 and P44, and the control unit selects the activated interface signal processing unit depending on voltage levels of the pins of the third connection port.

12. The communication module with dual systems according to claim 11, wherein the voltage levels of the pins of the third connection port are set depending on the pins that are coupled to a ground resistor.

13. A wireless device, being provided with the communication module with dual systems as claimed in claim 1 and with the external circuit, comprising a dual-band antenna or two uni-band antenna coupled to the communication module with dual systems to receive and transmit the first RF signal and the second RF signal.

14. The wireless device according to claim 13, wherein the first connection port comprises a first pin P2, a second pin P5, and a third pin P8, and when the wireless device receives and transmits the first RF signal and the second RF signal through the dual-band antenna, regarding the status of the external circuit, the first pin P2 is coupled to the dual-band antenna, and the second pin P5 and the third pin P8 are floating.

15. The wireless device according to claim 13, wherein the first connection port comprises the first pin P2, the second pin P5, and the third pin P8, and when the wireless device receives and transmits the first RF signal and the second RF signal through the two uni-band antennae, regarding the status of external circuit, the first pin P2 and the second pin P5 are respectively coupled to one of the two uni-band antennae, and the third pin P8 is coupled to a ground passive element.

16. A method for defining operating mode, being applicable to the operation mode of the communication module with dual systems according to claim 1, comprising steps of:

providing the communication module with dual systems; and forming the external circuit coupled to the first connection port into the dual-band antenna circuit or the uni-band antenna circuit to determine the operation mode of the communication module with dual systems.

17. The method for defining operating mode according to claim 16, wherein when the external circuit is formed into the dual-band antenna circuit, it is defined that the communication module with dual systems receives and transmits the first RF signal and the second RF signal through the dual-band antenna, and when the external circuit is formed into the uni-band antenna circuit, it is defined that the communication module with dual systems receives and transmits the first RF signal and the second RF signal through the two uni-band antennae.

18. The method for defining operating mode according to claim 17, wherein the first connection port comprises a first pin P2, a second pin P5, and a third pin P8, and when the communication module with dual systems receives and transmits the first RF signal and the second RF signal through the dual-band antenna, regarding the status of external circuit, the first pin P2 is coupled to the dual-band antenna, and the second pin P5 and the third pin P8 are floating.

19. The method for defining operating mode according to claim 17, wherein the first connection port comprises the first pin P2, the second pin P5, and the third pin P8, and when the communication module with dual systems receives and transmits the first RF signal and the second RF signal through the two uni-band antennae, regarding the status of external circuit, the first pin P2 and the second pin P5 are respectively coupled to one of the two uni-band antennae, and the third pin P8 is coupled to a ground passive element.

20. The method for defining operating mode according to claim 19, wherein the ground passive element is a ground inductor.

* * * * *